Sept. 23, 1969 P. T. BOAZ 3,468,651
PROCESS USING STATIONARY BLADES TO LATERALLY STRETCH
GLASS DURING FLOAT GLASS MANUFACTURING
Filed May 10, 1967 3 Sheets-Sheet 1

PREMAKARAN T. BOAZ
INVENTOR.

BY John R. Faulkner
Glenn S. Arendsen
ATTORNEYS

PREMAKARAN T. BOAZ
INVENTOR.

BY John R. Faulkner
Glenn S. Arendsen

ATTORNEYS

United States Patent Office 3,468,651
Patented Sept. 23, 1969

3,468,651
PROCESS USING STATIONARY BLADES TO LATERALLY STRETCH GLASS DURING FLOAT GLASS MANUFACTURING
Premakaran T. Boaz, Lincoln Park, Mich., assignor to Ford Motor Company, Dearborn, Mich., a corporation of Delaware
Filed May 10, 1967, Ser. No. 637,473
Int. Cl. C03c *15/02*
U.S. Cl. 65—91        7 Claims

ABSTRACT OF THE DISCLOSURE

Longitudinal pipes having blades formed thereon are positioned along the edge portions of the glass ribbon floating on molten tin in the float chamber used in manufacturing glass by the float process, said blades being stationary relative to the longitudinal direction of the glass ribbon and embedding the ribbon surface and laterally stretching the ribbon. Longitudinal friction between the blades and the glass prevents the longitudinal stretching forces from being transmitted to the molten glass entering the float chamber which would pull the molten glass away from the entrance. Coolant is circulated through members carrying the blades to cool the blades and the ribbon edge portions.

SUMMARY OF THE INVENTION

In the manufacture of glass by the float process, molten glass is floated on a molten metal bath where the glass ribbon attains an equilibrium thickness of about 0.280 inch. Various processes for producing glass of a more useful thickness include longitudinally stretching the glass by power driven rollers at the end of the float chamber, laterally stretching the glass by outwardly biased rollers positioned near the entrance into the float chamber as disclosed in U.S. patent application Ser. No. 482,510, filed Aug. 27, 1965, and now abandoned, or laterally stretching the glass near the entrance to the float chamber by fluid issuing from outwardly directed fluid outlets as disclosed in U.S. patent application Ser. No. 572,497, filed Aug. 15, 1966. The disclosures of both of these patent applications are incorporated herein by this reference.

The longitudinal stretching process, which is used widely, generally uses knurled wheels positioned near the edges of the glass ribbon to prevent the longitudinal forces from pulling the molten glass away from its entrance to the chamber. In each of the processes, the glass tends to return to its equilibrium thickness by narrowing laterally during the longitudinal stretching or after the lateral stretching. Furthermore, each process requires power driven rolls to draw the ribbon through the float chamber so the processes described in the above patent applications necessitate additional power equipment to achieve lateral stretching.

This invention provides a process for laterally stretching glass to a thickness differing from equilibrium thickness during its manufacture by the float process that inherently prevents the longitudinal forces drawing the ribbon through the float chamber from breaking the continuity of the molten glass as it enters the float chamber, and does not require additional power equipment. The process comprises floating a ribbon of molten glass on a bath of molten material within a float chamber, positioning blades along each edge of the ribbon with the blades contacting the ribbon and exerting lateral forces thereon to laterally stretch the ribbon, and drawing the ribbon through the float chamber while cooling the ribbon to produce a structurally integral ribbon of glass having a thickness less than its equilibrium thickness. Generally, physical indentations are produced in the ribbon by the blades, and the blades coact with the glass surrounding the indentations to exert lateral stretching forces on the ribbon.

The phrase "laterally stretching" is used in this application to identify both a physical widening of the ribbon with a decrease in thickness and a diminished narrowing of the ribbon under a longitudinal stretching force that decreases its thickness. In the latter situation the physical width of the ribbon can actually remain constant. Thus the phrase refers to active or passive lateral stretching. The term "indentations" refers to actual grooves in the glass produced by cutting through the surface thereof as well as relatively smooth depressions in the surface formed without breaking surface continuity. During the formation of depressions, the blade is not wetted by the glass, and depressions are preferred because the blades can be made of less expensive materials. The phrase "structurally integral" refers to glass that has been cooled sufficiently to be handled by normal mechanical rollers or conveyors without distorting, marring, or encountering other defects.

Preferably the blades are parallel to the ribbon edges and the leading portions of the blades form indentations in the ribbon that the following portions of the blades ride in to exert lateral forces on the ribbon. Multiple blades of this type can be spaced along each ribbon edge or a single continuous blade for each ribbon edge can be used. Alternatively, a plurality of blades can be positioned at an outwardly directed angle relative to the ribbon edges with short longitudinal spaces therebetween to laterally stretch the ribbon in stages.

The blades can be formed on one side of a thick walled pipe by cutting or grinding two scalloped portions longitudinally along the pipe. Coolant is circulated through the pipe to cool the blade and the edge of the ribbon. The blades are smoothed but otherwise untreated when only depressions will be formed in the glass by the blades. If the glass will wet the blades during usage, coatings of graphite, boron nitride, or other nonsticking materials are applied to the blades. Coatings of aluminum oxide, zirconium oxide or boron nitride also prevent blade corrosion in case of contact with the molten tin serving as the molten bath material.

DETAILED DESCRIPTION

Figure 1:
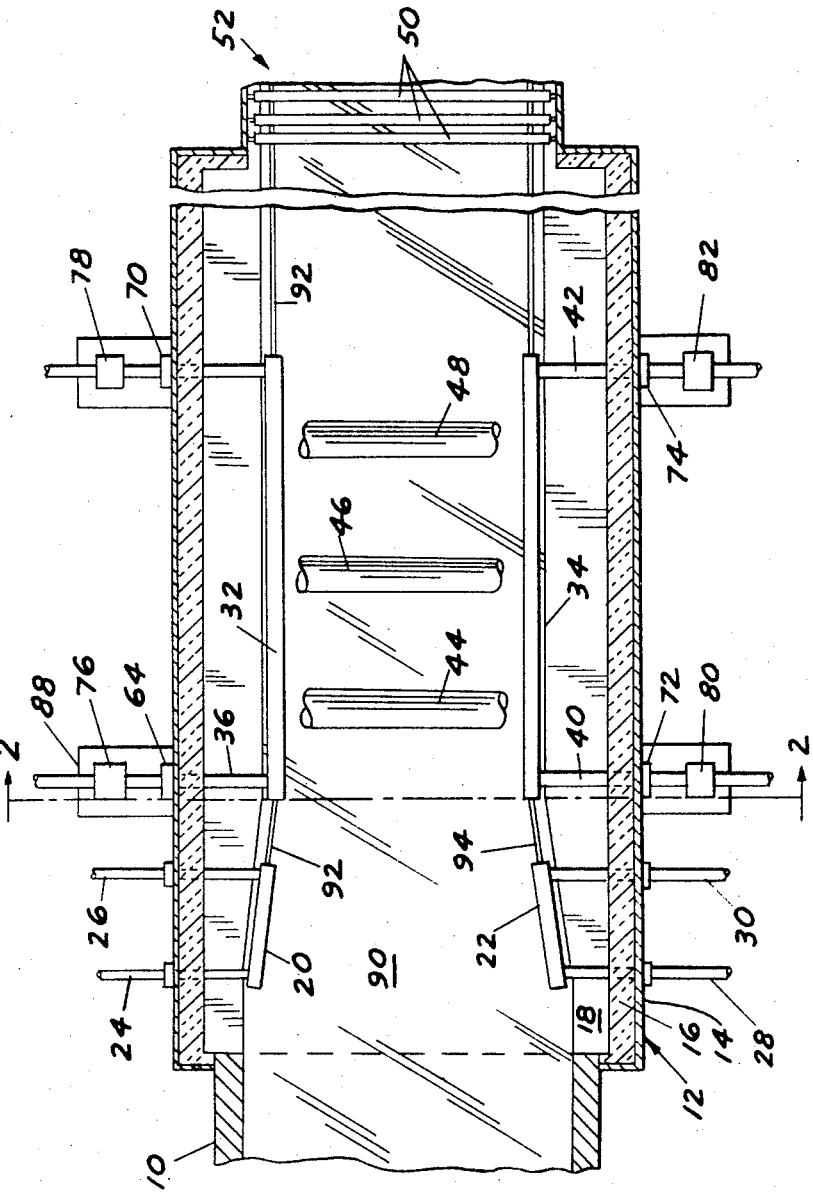
FIGURE 1 is a sectional view taken through the top of a float chamber showing two separate longitudinal pipes carrying blades positioned along each edge of the sheet.

Referring to FIGURE 1, a spout 10 connects a glass melting and refining furnace (not shown) with the interior of a float chamber represented by numeral 12. Float chamber 12 is similar to the float chamber described in Basler et al. U.S. patent application Ser. No. 404,247, now Patent Number 3,332,763, filed Oct. 16, 1964, the disclosure of which is incorporated herein by this reference, and comprises an enclosing housing 14 that is lined with refractory material 16. Molten metal 18 such as tin covers the bottom of the interior of chamber 12.

Two thick walled pipes 20 and 22 are positioned within chamber 12 downstream or to the right in FIGURE 1 of spout 10 and slightly above the surface of molten metal 18. Pipes 20 and 22 are located near the side walls of the chamber and are angled slightly inward. The ends of pipes 20 and 22 are closed by welding a plate (not shown) thereon. Feeder pipes 24 and 26 communicate with the passage in pipe 20 and are fastened to the wall thereof near each end. Feeder pipes 24 and 26 project through openings in the side wall of chamber 12 at approximately right angles to the side wall. Similarly, feeder pipes 28 and 30 are attached to the wall of pipe 22 and project through the opposite side wall of chamber 12.

Downstream of pipes 20 and 22, similar thick walled pipes 32 and 34 are positioned along the side walls of chamber 12. Feeder pipes 36 and 38 are fastened to pipe 32 and feeder pipes 40 and 42 are fastened to pipe 34 near the ends thereof. The feeder pipes are connected to a means (not shown) for circulating coolant through the feeder pipes and the thick walled pipes.

Cooling coils 44, 46 and 48 are located within chamber 12 above pipes 32 and 34. Further downstream of pipes 32 and 34, a plurality of power driven rolls 50 are located in the exit 52 of float chamber 12.

Figure 2:
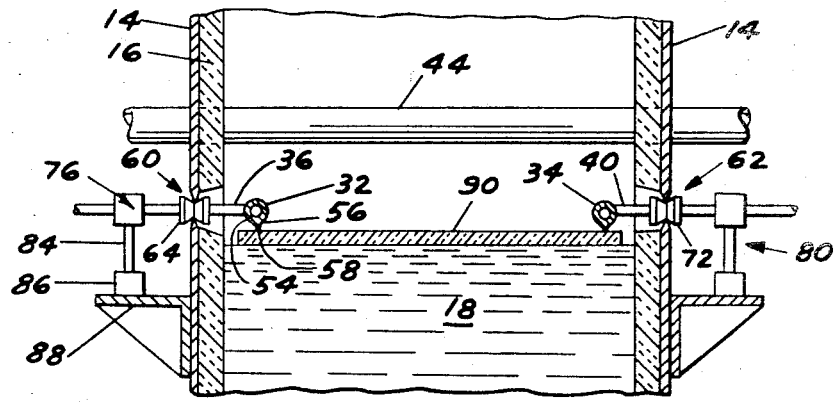
FIGURE 2 is a sectional view taken along line 2—2 of FIGURE 1 showing the blades contacting the sheet and the mechanism used to bias the blades onto the sheet.
Figure 3:
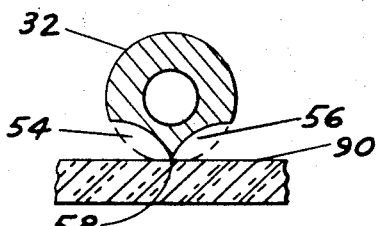
FIGURE 3 is an enlarged cross section of one of the longitudinal pipes showing the blade formed thereon.

Referring now to FIGURES 2 and 3, the bottom side of each thick walled pipe has scallops 54 and 56 removed therefrom as shown graphically for pipe 32. Scallops 54 and 56 can be removed by grinding portions of the wall, for example, and are arranged to leave a blade 58 projecting downwardly between the scallops.

Figure 4:
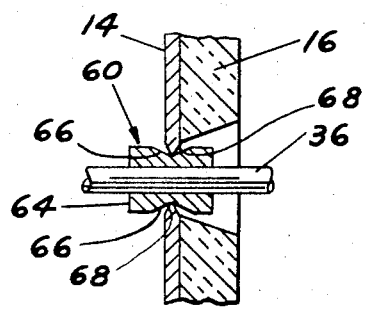
FIGURE 4 is an enlarged cross-sectional view of one of the sleeves positioning the feeder pipes in the side walls of the float chamber.

Feeder pipes 36, 38, 40 and 42 pass through openings in the side walls of chamber 12 represented in FIGURE 2 by numerals 60 and 62 for pipes 36 and 40. Taking opening 60 as an example, pipe 36 passes through a sleeve 64 located within opening 60 as shown in more detail in FIGURE 4. Sleeve 64 has a circumferential notch 66 formed in its exterior surface and the circumference of the side wall of housing 14 surrounding opening 60 is tapered as at 68. Taper 68 is more acute than notch 66 and the point of the taper has a diameter approximately equal to the minimum diameter of notch 66. Sleeve 64 is made in two longitudinal sections that are first positioned within opening 60 with taper 68 fitting into notch 66. Then feeder pipe 36 is inserted through sleeve 64 and sleeve 64 is fastened to pipe 36 by any conventional fastening means. Sleeves 70, 72 and 74 (see FIGURE 1) identical to sleeve 64 are fitted into the openings for feeder pipes 38, 40 and 42, respectively. Refractory material 16 widens toward the interior of float chamber 12 as shown in FIGURES 2 and 3.

Outside of chamber 12 as shown in FIGURE 1, mechanisms 76, 78, 80 and 82 are fastened to feeder pipes 36, 38, 40 and 42, respectively. Mechanism 76 is representative and is shown in more detail in FIGURE 2. A rigid member 84 is fastened to pipe 36 and projects downwardly into a biasing means 86 that is mounted on a platform 88 fastened to the side wall of housing 14. Biasing means 86 can contain a compressive spring or hydraulic piston, for example, exerting a force between platform 88 and pipe 36.

The interior of chamber 12 is pressurized slightly with a protective gaseous atmosphere consisting essentially of a major portion of nitrogen with minor amounts (about 4%) of reducing gases such as hydrogen and carbon monoxide. Preferably the protective atmosphere contains no more than traces of oxygen, carbon dioxide and water vapor.

Operation

Spout 10 delivers molten glass from the furnace onto the surface of molten metal 18 in the form of a ribbon 90. Ribbon 90 is cooled as it moves to the right in float chamber 12 and is a structurally integral glass ribbon when it reaches power driven rolls 50. Rolls 50 exert a longitudinal force on the ribbon that draws the ribbon through the float chamber.

Pipes 20 and 22 are positioned along the edges of ribbon 90 with the blades formed thereon contacting the edges of ribbon 90. The forces exerted by the leading edges of the blades on the ribbon are sufficient to form indentations 92 and 94 in the ribbon surface as the ribbon moves under the blades. Coolant circulating through pipes 20 and 22 cools the edges of the glass sufficiently for the blades to coact with the glass to maintain the width of the ribbon. The blades on pipes 32 and 34 ride in indentations 92 and 94, respectively, to maintain the width of the ribbon between those pipes.

As the ribbon moves through the float chamber, coolant circulating through coils 44, 46 and 48 cools the ribbon into a structurally integral sheet. The longitudinal forces exerted on the sheet by rolls 50 are transmitted through the sheet to stretch the glass as it passes through the float chamber. Ordinarily these longitudinal forces would narrow the width of the ribbon, but the lateral resistance offered by the blades prevents narrowing and thereby results in a laterally stretched glass sheet having a thickness less than its equilibrium thickness.

Mechanisms 76, 78, 80 and 82 act through the respective feeder pipes to move the blades on pipes 32 and 34 vertically toward or away from the glass as desired to vary the forces existing between the blades and the glass. In addition to the lateral forces exerted by these blades on the glass, sufficient longitudinal drag exists to prevent all of the longitudinal force exerted by rolls 50 from being transmitted up to ribbon 90 where it emerges from spout 10, which would break ribbon continuity by pulling the soft ribbon away from the spout. With springs or hydraulic pistons in the biasing means of the mechanisms, variations in the vertical position of the glass are compensated automatically. Similar mechanisms can be used to locate pipes 20 and 22.

Figure 5:
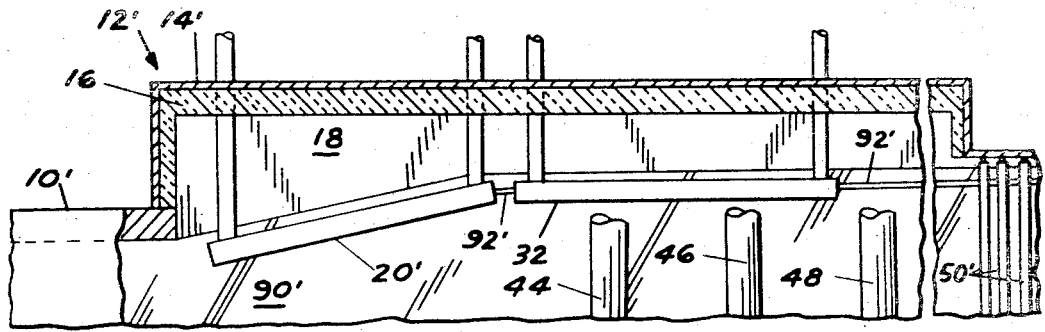
FIGURE 5 is a top sectional view of one side of an embodiment in which the blades are angled outward with respect to the chamber to stretch the ribbon laterally in an active manner.
Figure 6:
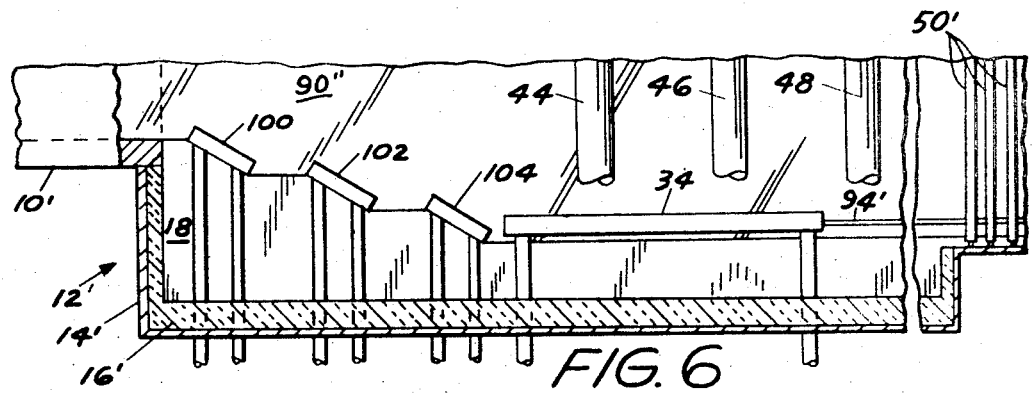
FIGURE 6 is a view of one side of an embodiment in which a plurality of blades are angled outward with respect to the side walls.

Construction and operation of FIGURES 5 and 6

In FIGURE 5, a thick walled pipe 20' positioned just downstream of spout 10' is angled outward toward the adjacent side wall of the float chamber. Pipe 32 is located downstream of pipe 20' in substantially the same position as in FIGURE 1. Pipes corresponding to pipe 20' and pipe 32 are located on the opposite side of the chamber. Each of the pipes is constructed according to FIGURE 3 and can be positioned by the vertical positioning mechanisms and cooled by circulating coolant therethrough as described above.

Shortly after spout 10' deposits a ribbon 90' of molten glass on molten metal 18, the blades of pipe 20' and its corresponding pipe contact the ribbon edges. Power rolls 50' exert a longitudinal force on ribbon 90' that draws the ribbon through the chamber. The blades on pipe 20' and its corresponding pipe resist this longitudinal force by exerting on the ribbon a lateral component that laterally stretches ribbon 90' as the ribbon moves downstream, and a longitudinal component that prevents the molten glass from pulling away from spout 10'. Thus pipe 20' and its corresponding pipe convert the longitudinal force into an active lateral stretching force.

Pipe 32 and its corresponding pipe passively stretch the ribbon laterally by maintaining the ribbon width constant. The latter pipes can ride in indentation 92' produced by pipe 20' and the corresponding indentation on the opposite ribbon edge.

FIGURE 6 shows a plurality of shorter pipes 100, 102 and 104 positioned in sequential steps just downstream of spout 10'. Pipe 100 is directly downstream of the opening of spout 10', pipe 102 is a short distance outboard and downstream of pipe 100, and pipe 104 is a short distance outboard and downstream of pipe 102. Each of pipes 100, 102 and 104 is angled outwardly with respect to the general direction of the ribbon edge. Downstream of pipe 104, pipe 34 is positioned substantially parallel to the side wall of chamber 12' and the general direction of the ribbon edge. Corresponding pipes (not shown) are positioned on the opposite side of the chamber.

The FIGURE 6 construction operates in substantially the same manner as FIGURE 5 except the active lateral stretching occurs in sequential steps. As power rolls 50' move ribbon 90" through the chamber, the leading portion of the blade on pipe 100 first contacts a sector of the ribbon and, in cooperation with its corresponding pipe, laterally stretches that sector until the sector reaches the ends of the pipes. The sector narrows slightly as it passes between pipe 100 and pipe 102 and then enters the second stretching stage when the blades on pipe 102 and its corresponding pipe contact the ribbon. A similar process occurs when the sector reaches pipe 104 and its corresponding pipe. Subsequently, pipe 34 and its corresponding pipe continue the stretching in a passive manner by maintaining ribbon width substantially constant.

Sequential lateral stretching provides the ribbon with brief relaxation time intervals in which the stresses in the ribbon tend to equalize. The depressions formed in the ribbon by the blades of pipes 100, 102 and 104 generally disappear when the surface moves from under the blade because of the soft nature of the ribbon at that stage. Shorter, spaced blades of the FIGURE 6 type can be substituted in the passive stretching areas (i.e., for blades 32 and 34) if desired.

Figure 7:
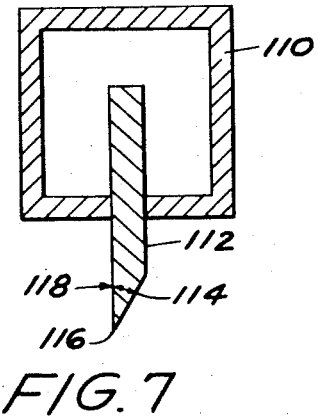
FIGURES 7 and 8 are sectional views of alternate blade constructions.
Figure 8:
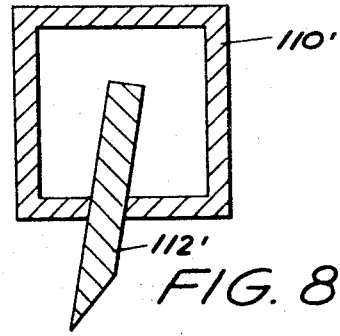

In the alternate blade construction shown in FIGURE 7, a rectangular pipe 110 has an elongated blade member 112 projecting through one wall into the interior of the pipe. Blade member 112 is welded or otherwise sealingly fastened to pipe 110 and is positioned substantially perpendicular to the plane of the ribbon. The inner side of blade member 112 is inclined as at 114 to a knife edge 116, with the inclined angle 118 being about 30°. Coolant is circulated through pipe 110 and because of the large portion of blade member 112 projecting into the coolant, the FIGURE 7 construction provides increased cooling for the knife edge.

Where relatively high lateral forces are being applied to the ribbon, a blade construction similar to that shown in FIGURE 8 can be used. In FIGURE 8, blade member 112' is angled outward relative to pipe 110' and the plane of the ribbon with a typical angle being about 10°. FIGURE 8 constructions are most useful in locations substantially downstream of spout 10 where high longitudinal forces applied to the ribbon produce high lateral forces tending to narrow the ribbon.

The FIGURES 7 and 8 constructions are used efficiently in a combination where the FIGURE 7 construction contacts the glass ribbon just downstream of the spout where the blades resist the longitudinal force exerted on the ribbon by the power driven rolls, thereby preventing the longitudinal force from breaking the ribbon continuity at the spout; and the FIGURE 8 construction contacts the ribbon further downstream to actively or passively stretch the ribbon laterally.

Water can be used as the coolant circulating in the pipes and cooling coils. The blades can be positioned at outwardly or inwardly directed angles relative to the sides of the chamber or the edges of the glass sheet as desired. Blade length can be anywhere from less than a few inches to more than several feet, and the leading and trailing edges are smoothly rounded to prevent abrupt contact with the ribbon. The inwardly directed blades of course would produce glass having a thickness greater than its equilibrium thickness. Ordinary schedule 80 pipe can be used as the thick walled pipes.

Thus this invention provides a process for laterally stretching glass to a thickness differing from its equilibrium thickness while the glass is floating on a molten metal bath that converts the longitudinal forces drawing the ribbon through a float chamber into lateral stretching forces. The process also inherently prevents longitudinal forces from breaking the continuity of the molten glass, and permits continuous or sequential active or passive lateral stretching.

What is claimed is:

1. A process for laterally stretching glass to a thickness differing from its equilibrium thickness during its manufacture by the float process comprising boating a molten glass ribbon on a molten bath within a float chamber, positioning stationary blades relative to the longitudinal direction of the ribbon, said blades embedding the ribbon surface and exerting lateral forces on the ribbon to laterally stretch the ribbon, and drawing the ribbon through the float chamber while cooling the ribbon to produce a structurally integral ribbon of glass having a thickness less than equilibrium thickness, said blades sliding on the ribbon surface as the ribbon moves through the float chamber.

2. The process of claim 1 comprising positioning a plurality of said blades at outwardly directed angles relative to the side walls of the chamber and sequentially spacing said blades longitudinally downstream to sequentially laterally stretch and laterally relax the ribbon, said plurality of blades embedding the ribbon surface.

3. The process of claim 2 comprising sliding the blades on the ribbon surface with sufficient resistance existing between the glass and the blades so the blades prevent longitudinal stretching forces exerted on the ribbon from pulling the molten glass away from its entrance to the float chamber.

4. The process of claim 3 comprising passing coolant through the longitudinal blades to cool the blades and the longitudinal edge portions of the ribbon.

5. A process for laterally stretching glass to a thickness differing from its equilibrium thickness during its manufacture by the float process comprising floating a molten glass ribbon on a molten bath, drawing the ribbon across the bath by exerting a longitudinal force on the ribbon, and embedding outwardly directed blades with the ribbon surface to convert said longitudinal force into a lateral component that laterally stretches the ribbon, said blades being stationary relative to the longitudinal direction of the ribbon and sliding on the ribbon surface as the ribbon moves across the bath.

6. The process of claim 5 comprising physically indenting the ribbon surface with the blades without wetting the blades with the glass, and coacting the blades with the portions of the ribbon surface surrounding the indentations to exert lateral stretching forces on the ribbon.

7. A process for laterally stretching glass to a thickness differing from its equilibrium thickness during its manufacture by the float process comprising floating a continuous molten glass ribbon on a molten bath by issuing molten glass from a spout connected to a glass melting furnace, drawing the ribbon across the bath by exerting a longitudinal force on the ribbon, embedding the ribbon surface just downstream of the spout with stationary blades relative to the longitudinal direction of the ribbon, said blades being positioned substantially perpendicular to the plane of the ribbon to prevent the longitudinal force from breaking the ribbon continuity at the spout, and embedding the ribbon surface with stationary blades relative to the longitudinal direction of the ribbon, said blades being positioned at outwardly directed angles relative to the plane of the ribbon downstream of the substantially perpendicular blades, said blades sliding on the ribbon surface as the ribbon moves through the float bath.

References Cited

UNITED STATES PATENTS

| | | | |
|---|---|---|---|
| 1,505,584 | 8/1924 | Campbell | 65—199 X |
| 1,641,948 | 9/1927 | Blair | 65—91 |
| 1,767,094 | 6/1930 | Reece | 65—91 |
| 3,266,880 | 8/1966 | Pilkington | 65—99 |
| 3,326,653 | 6/1967 | De Lajarte et al. | 65—99 |
| 3,353,943 | 11/1967 | Loutte | 65—99 |

S. LEON BASHORE, Primary Examiner

E. R. FREEDMAN, Assistant Examiner

U.S. Cl. X.R.

65—65, 99, 182, 200, 201